March 17, 1942.  H. W. JOHNSON  2,276,727
BORING AND PIPE CUTTING MACHINE
Filed May 24, 1941   3 Sheets-Sheet 2

INVENTOR,
Howard W. Johnson,
BY H. M. Kilpatrick
Attorney

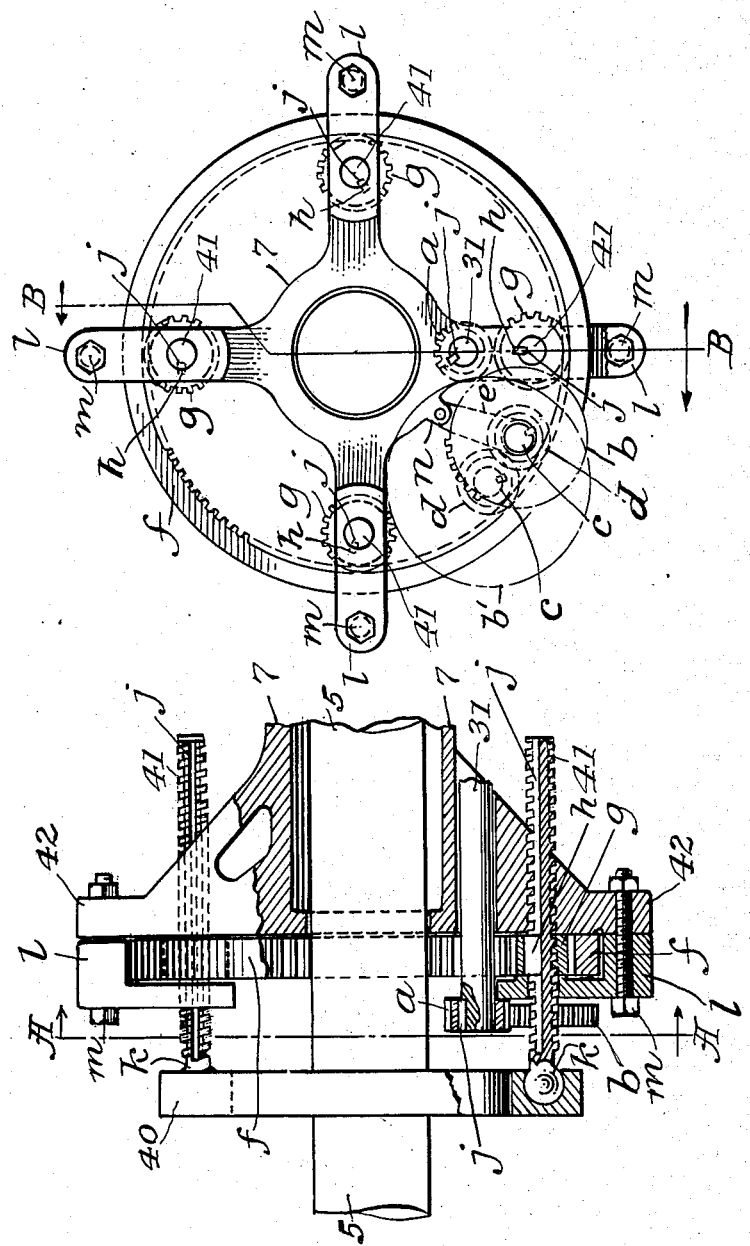

Patented Mar. 17, 1942

2,276,727

UNITED STATES PATENT OFFICE 2,276,727

BORING AND PIPE CUTTING MACHINE

Howard W. Johnson, Elizabeth, N. J.

Application May 24, 1941, Serial No. 395,097

20 Claims. (Cl. 77—2)

This invention relates to new and useful improvements to internal pipe cutters and boring machines. Such a pipe cutter is generally referred to as a flue cutter, which is employed for cutting off the tips or ends of boiler flues.

An object of my invention is to provide a cutting mechanism suitable for cutting not only boiler flues, the thickness of which is measured by gauge such as the Birmingham wire gauge, but also for cutting large diameter tubes whose thickness is measured in large fractions of an inch and commonly used in oil heaters, furnaces, and heat exchanger equipment such as are used in the refining of oil.

Another object of my invention is to provide a portable boring machine which will function with more flexibility than such machines as are presently known and available.

Additional objects of the invention are to effect simplicity and efficiency in such apparatus and to provide a simple apparatus of this kind which is durable and reliable in operation, and economical to manufacture.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein for connection with a borer or pipe cutter which briefly stated, includes a hollow shaft rotary in a housing and positioned to project into a pipe or bore to be cut and provided near the forward projecting end with radial slots. A mandrel slidable in said shaft has a threaded bore in its rear end and is provided on opposite sides with rearwardly tapered grooves receiving the inner ends of cutting bits having cutting ends projecting from said slots. A screw rod engaged in said threaded bore is provided with a drum receiving an adjustable brake clamp held from rotation relative to the housing and having accessible adjusting means for varying the brake pressure on the drum. Suitable means are provided for rotating the hollow shaft and with it the mandrel, whereby adjusting the brake pressure may cause the screw rod to yieldably gradually automatically advance the mandrel and project the cutting bits against the pipe during cutting.

In the accompanying drawings showing, by way of example, one of many possible embodiments of the invention:

Figs. 6 and 7 are respectively longitudinal and transverse sectional views, partly in elevation, of a longitudinal feed mechanism, Fig. 6 being taken along the line B—B of Fig. 7, and Fig. 7 being taken along the line A—A of Fig. 6.

Figure 1:
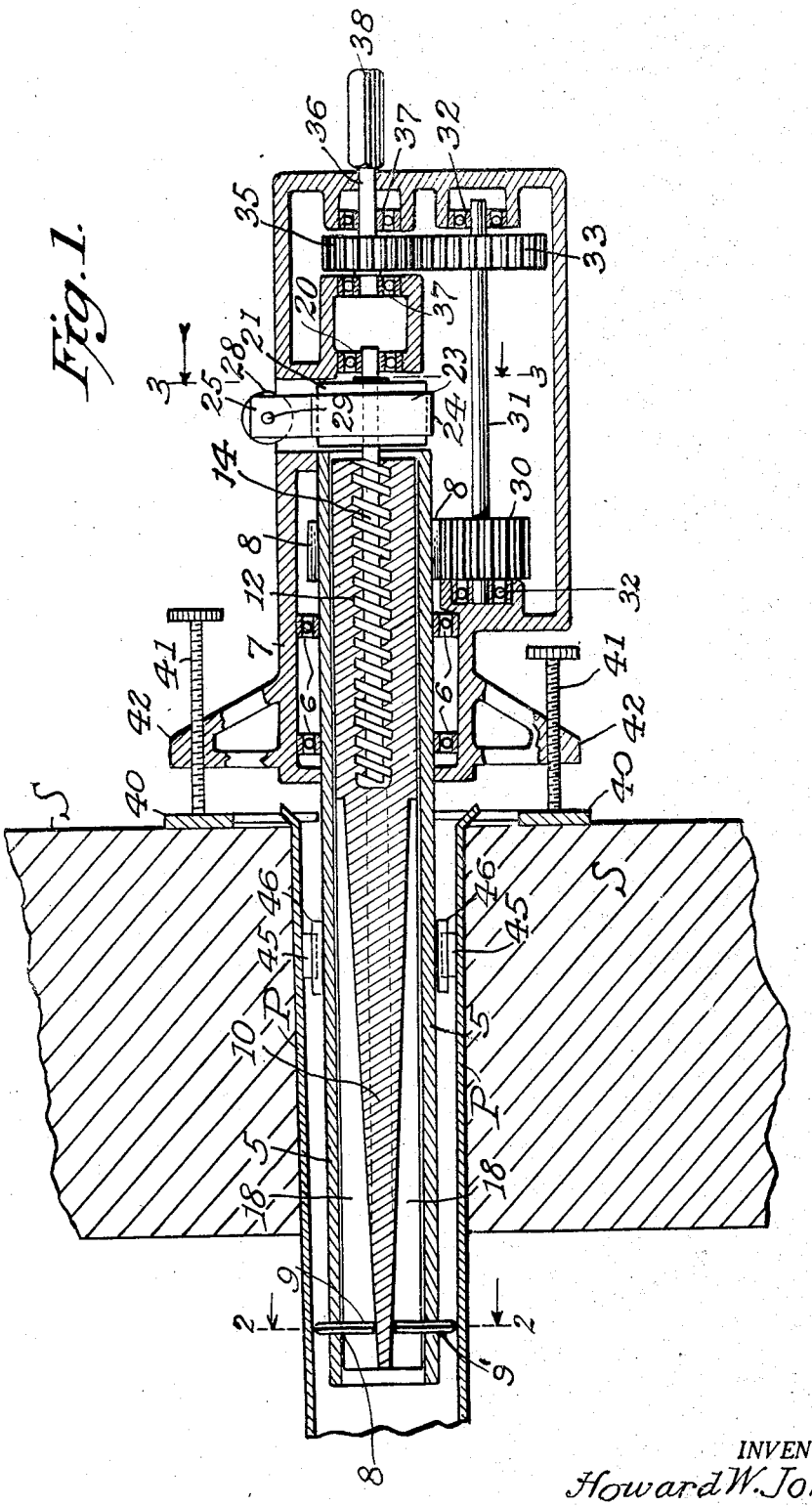
Fig. 1 is an axial section, partly in elevation, of a practical embodiment of my invention.
Figure 2:
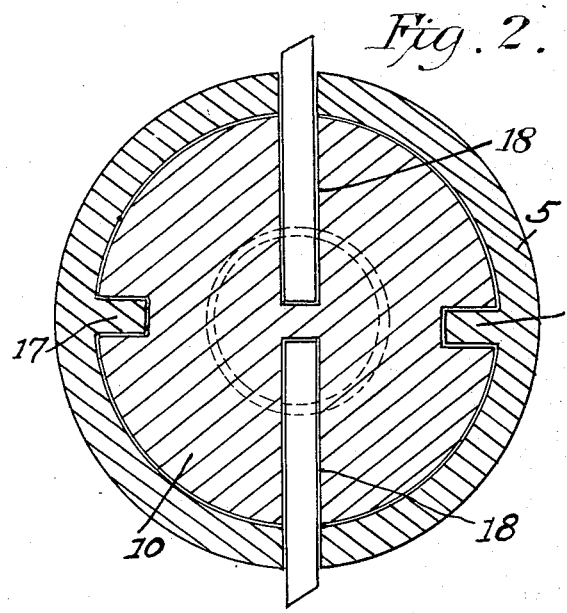
Fig. 2 shows cross-section taken on the line 2—2 of Fig. 1 looking in the direction of the arrow.
Figure 3:
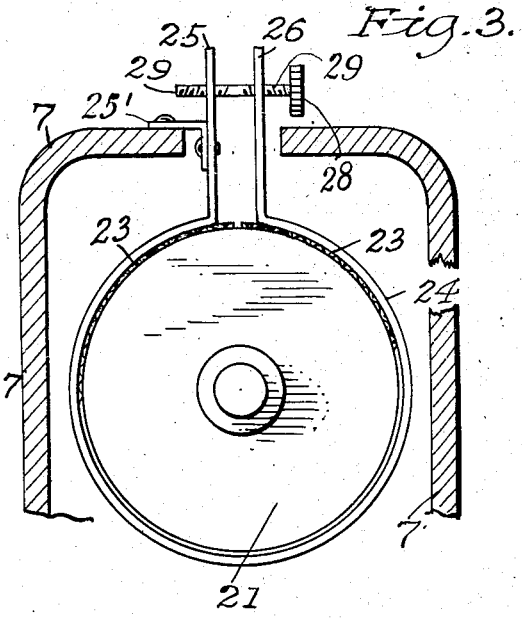
Fig. 3 is a view of the brake device taken on the lines 3—3.
Figure 4:
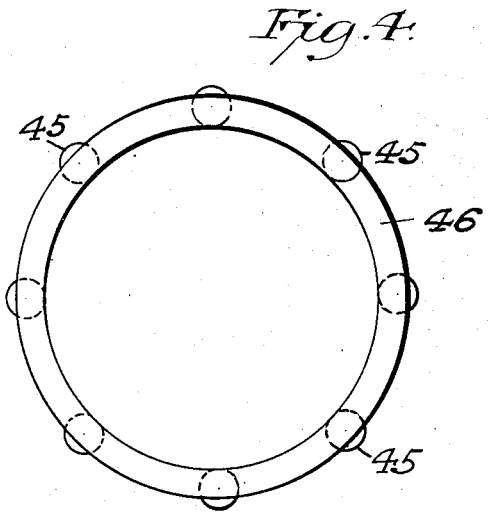
Figs. 4 and 5 are respectively end and side elevations of the centering bearing for the shaft.
Figure 5:
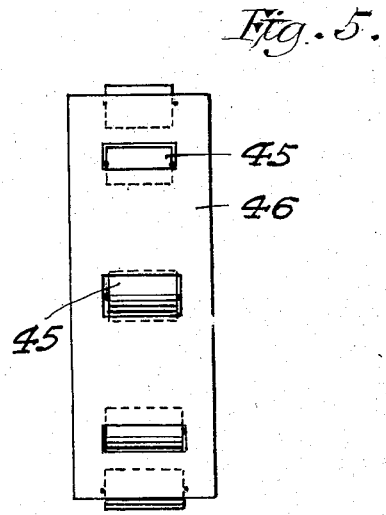

The device comprises a hollow shaft or tool stock 5 disposable in the pipe P and mounted and revolving in bearings 6, mounted in a housing 7. On one end of the shaft tool stock 5 a ring gear 8 is secured for revolving the shaft as will be later explained. In the other end of the shaft are a plurality of holes or slots 9' for radially slidably receiving bits or cutters 9. A mandrel 10 of substantially round stock is finished exteriorly to permit a machine fit within the tool stock 5 as shown, and has an internally threaded bore 12 at the rear or outer end receiving the threads of screw rod 14. The mandrel is slotted from the end to end on diametrically opposite sides to receive tracks 17 integral with the tool stock 5. The mandrel 10 is provided on opposite sides with recesses or tapering grooves 18 deepest at the forward end and decreasing in depth rearwardly toward the central portion of the mandrel. The recesses or grooves 18 function as seats or holders for the bits or cutters 9. The outer or rear end of the screw rod 14 is journaled in a bearing 20 mounted in the housing 7. The screw rod is formed with an integral brake drum 21 between the shaft 5 and bearing 20.

A brake band 23 is wrapped around the brake drum and is tied to a brake clamp 24 having radial end ears 25, 26, one of which is suitably fastened by a bracket 25' to and stopped by the housing 7. The brake clamp is contracted or expanded by turning a headed screw 28, 29 having right and left handed threads 29 engaged with threads in the ears 25, 26.

For rotating the tool stock 5 I provide the ring gear 8 on the tool stock engaging with a pinion 30 fast on a jack-shaft 31 mounted in bearings 32 mounted in the housing. The jack shaft carries fast thereon another gear 33 engaging with a drive pinion 35 keyed to a drive shaft 36 rotary in bearings 37 mounted in the housing. Said drive shaft 36 is suitably shaped on its end 38 outside of the housing to engage with a standard socket usually mounted on standard air motors.

In order that an accurate length of pipe or tube may be cut and that the axis of the tool stock is held coaxial with the pipe or tube, a circular ring 40 engagable with the tube sheet S receiving the pipe P, is mounted by suitably adjustable means, such as screws 41 having threaded engagement in brackets 42 forming part of housing 7.

Said adjustable means 40, 41 may be provided with automatic means to impart endwise motion to the mechanism as a whole, which in addition to the radial feed would permit internal boring operations. By way of illustration, in Figs. 6 and 7 the jack shaft 31 has a pinion $a$ keyed thereon. rotation of the jack shaft and the pinion $a$ meshing with the interchangeable gear $b$ keyed to a stub shaft $c$, causes rotation of the shaft $c$ and a pinion $d$ on its opposite end, which pinion $d$ in turn meshes with a ring gear $f$. The ring gear $f$ meshes with each of four pinions $g$ keyed to, and slidable on the screw rods 41. Rotation of the screw rods 41 in the threads of the brackets 42, causes longitudinal movement of the screws and the squaring ring 40, retaining pieces $l$ held in place by bolts $m$ being provided to resist thrust of the ring gear $f$ and the screw rod pinions $g$ in a direction longitudinally of the screw rods. Each rod is furnished with a keyway $j$ in which a key $h$ of the pinion engages and transmits rotation from the pinions to the screw rods.

The connection between screw rods 41 and squaring ring 40 has been shown as a ball socket arrangement indicated by $k$. This is similar to that used in the well-known machinist's C clamps.

The shaft $c$ rotates in and is supported by bracket $e$ pivoted to the housing as at $n$. This bracket may be swung to permit substitution of a gear $b'$ for $b$ on the shaft $c$ in order to secure a change of speed of rotation of the pinions $g$, this being a ratio changing means well known in lathes.

For the sake of clarity in each of the gears and pinions in Fig. 7, several teeth only have been indicated on each gear.

In order that the tool stock 5 may be accurately coaxial with the pipe or tube P to be cut, a readily mounted and demounted bearing 45, 46 comprising rollers 45 mounted in a cage 46 may be provided on the tool stock 5. For a given size of tool stock several sizes of bearing may be furnished for engagement within the corresponding several sizes of pipe or tube. The inside diameter of each of such several bearing sizes would be identical and equal the outside diameter of the tool stock 5 plus a suitable tolerance to permit convenient mounting and demounting, whereas the outside diameter of each of the several bearing sizes would differ and equal that of the inside diameter of the pipe P or work to be cut or bored, less a suitable tolerance.

With the foregoing description of the construction of my mechanism in mind, following is a description of the operation.

The ring 40 is first adjusted so that the distance from ring to bit 9 equals that from the end of the pipe or tube to the point of boring or cut-off. With the bits or cutters 9 and mandrel in slightly more retracted position than shown, the device is brought into position by inserting the tool stock 5 within the pipe or tube P or other hollow material until the ring 40 bears against the tube sheet S or the end of said hollow material. The device is then ready for operation and a power motor is engaged with a suitable socket onto the drive shaft end 38. Rotation of the shaft 36 and pinion 35 revolves the jackshaft 31 through their respective gears 30, 33. The jack-shaft gear 30 engaging with ring gear 8 revolves the tool stock 5. The mandrel 10 is driven to rotate with tool stock 5 through engagement with the tracks 17 which form part of said tool stock. The tool stock and mandrel together serve as a tool holder for the cutter bits 9. Since the screw rod 14 engages the female threaded portion 12 of the mandrel, the screw rod and the brake drum rotate with the mandrel when the brake band 23 is loose. Contraction of the brake clamp 24 by turning the head 28 serves to retard or to stop the rotation of the brake drum 21 and screw rod 14. Any reduction or stopping of the rotation of the screw will cause the mandrel 10 to unthread from the screw rod 14, and hence travel laterally away from the brake drum, through the tool stock 5 and into the tube pipe P or hollow material. The lateral travel of the mandrel serves to push the cutter bits 9 apart in a radially outward direction by the wedging action of the recesses 18 of varying depth in the mandrel. As the bits or cutters travel out they cut or bore deeper into the pipe or tube or hollow material and the rotation of bits or cutters with the tool stock displaces the material.

The brake screw 28, 29 may be set to give a predetermined brake pressure before operating the unit in order that the travel of the mandrel and consequent feeding of the bits or cutters will function automatically. However, the brake screw 28, 29 may also be adjusted while the mechanism is under operation to permit automatic feeding of the bits or cutters by the feel of the operator. While this operation is in progress the mechanism may also be manually or automatically gradually moved into the pipe or other structure to provide a lateral feed to the bits or cutters along the pipe or bore as above discussed and thereby function to bore a predetermined internal pattern, contour, or surface.

When the operation is completed a reversal of the driving motor and/or mechanism with the brake fully contracted will cause the mandrel to travel back to the starting position by screwing onto the screw rod.

I claim as my invention:

1. A pipe cutter comprising a housing; a hollow shaft rotatably mounted in said housing and projecting from the housing provided in the projecting end with radial slots; a mandrel slidable in said shaft and having a threaded bore in its rear end and having on opposite sides rearwardly diverging faces; cutting bits resting on said faces and projecting from said slots; a screw rod engaged in said threaded bore and provided with a brake drum; an adjustable brake means for varying pressure on the drum; and means for rotating the mandrel and hollow shaft; whereby the brake pressure may cause the screw rod to advance the mandrel and project the cutting bits.

2. A cutter or borer comprising a support; a hollow shaft rotatably mounted on said support and positioned to project into a pipe or bore to be cut and provided near the forward projecting end with radial slots; a mandrel slidable in said shaft having a threaded bore in its rear end and provided on opposite sides with rearwardly tapered grooves; cutting bits resting in said grooves and having cutting ends projecting from said slots; a screw rod engaged in said threaded bore and provided with a drum; an adjustable brake clamp on said drum held from rotation relative to the support and having accessible adjusting means for varying the brake pressure on the drum; means for rotating the hollow shaft; and means for causing rotation of the mandrel with the hollow shaft; whereby adjusting the brake pressure may cause the screw rod to yieldably gradually automatically advance the mandrel and project the cutting bits as the bits are revolved against the pipe during cutting.

3. A pipe cutter comprising an elongated housing having an opening at the forward inner end, spaced bearings in the forward end portion of the housing coaxial with the opening, and a lateral opening to the rear of the bearing; a hollow shaft rotatably mounted in said bearings and adapted to project into a pipe to be cut, and provided near the forward projecting end with radial slots; a mandrel snugly slidable in said shaft having a threaded bore in its rear end and having its opposite sides with rearwardly tapered grooves; cutting bits resting in said grooves and having cutting ends projecting from said slots; a screw rod engaged in said threaded bore and provided with a brake drum opposite said lateral opening; an adjustable brake clamp on said drum, having adjusting means projecting from the lateral opening for varying the brake pressure on the drum; a tool receiving drive shaft alined with the hollow shaft and mounted in the outer end of housing; means driven by the drive shaft for rotating the hollow shaft; and means for causing rotation of the mandrel with the hollow shaft, whereby adjusting the brake pressure may cause the screw rod to yieldably gradually automatically advance the mandrel and project the cutting bits as the bits are revolved against the pipe during cutting.

4. In combination, a support; a shaft rotatably mounted in said support; a bit mounted on said shaft for outward movement; means for rotating the shaft; a brake drum; means yieldably operatively connecting the shaft and brake drum for rotating the brake drum as the shaft rotates, and a braking device adapted to engage the drum to effect relative rotation between the drum and the shaft, whereupon said yieldable means becomes operative to retract or project the bit.

5. In combination, a support; a shaft rotatably mounted in said support and having a projecting forward end having radial slots; cutting bits projecting through said slots; a brake drum coaxially with the shaft and mounted for rotation relative thereto; means for rotating the shaft; means operatively connected to the shaft and drum for retracting or projecting the cutting bits on rotation of the shaft and drum relative to each other; and adjustable brake means for varying pressure on the drum.

6. A pipe cutter comprising a support; a hollow shaft rotatably mounted in said support and provided with a projecting forward end having radial slots; cutting bits in the slots; a mandrel slidable in said shaft and having a threaded bore in its rear end; means operated by the mandrel for projecting the bits as the mandrel advances; a screw rod engaged in said threaded bore and provided with a brake drum; an adjustable brake means for varying pressure on the drum whereby to effect relative rotation between the shaft and drum to cause the mandrel to advance and project the bits; and means for rotating the mandrel and hollow shaft.

7. A pipe cutter comprising a housing; a hollow shaft rotatably mounted in said housing and provided with a projecting end having radial slots; a mandrel slidable in said shaft and having a threaded bore in its rear end and having on opposite sides rearwardly diverging faces; cutting bits resting on said faces and projecting through said slots; a screw rod engaged in said threaded bore and provided with a brake drum; an adjustable brake means for varying pressure on the drum; and means for rotating the mandrel and hollow shaft together whereby the brake pressure may cause the screw rod to advance the mandrel relative to shaft and project the cutting bits.

8. In combination, a support; a shaft rotatably mounted in said support and having a forward projecting end; bore engaging tools projecting from said end; drive means for rotating the shaft; a transverse engagement member disposed in a plane transverse to said forward projecting end; and means supporting the engagement member on said support and operated by the drive means for uniformly and automatically gradually moving the support and shaft with respect to the engagement member as the shaft rotates.

9. In a combination as in claim 8 means to project the tools as the shaft rotates.

10. In a combination as in claim 8, means to at will automatically gradually project the tools as the shaft rotates.

11. In combination, a support; a main shaft rotatably mounted in said support and having a forward projecting end; cutting bits projecting from said end; means including a rotary jack shaft parallel to the main shaft for rotating the main shaft; the forward part of the support being provided with bores parallel to the shafts; a squaring member in a plane transverse to said forward projecting end; screws in said bores and having their forward ends mounted in said member; internally threaded pinions on said screws and adapted on rotation to cause the screws to move longitudinally; and gear means of adjustable ratio adapted to be selectively inserted for connection to the jack shaft to mesh with the pinions.

12. In a combination as in claim 11 means to at will automatically gradually project the bits as the main shaft rotates; whereby a taper cut may be made.

13. In a combination as in claim 11 means to project the bits as the main shaft rotates.

14. A pipe cutter comprising a housing; a member mounted in said housing and provided with a forward projecting end carrying radial cutting bits; drive means in the housing including a rotary shaft parallel to said member and projected from the forward end of the housing; lateral brackets on the forward part of the housing and provided with bores parallel to the shafts; a squaring ring member spaced around the shaft right angularly transverse thereto forward of the housing; screws in said bores provided and having their forward ends mounted in said ring; internally threaded pinions on said screws and held against longitudinal movement relative to said brackets; a ring gear around and meshing with the pinions; and gear trains of different ratio adapted to be selectively inserted for connection to the projecting end of the shaft and having a gear meshing with the ring gear for driving the ring gear and pinions and thereby driving the housing and bits longitudinally relative to the squaring ring.

15. A pipe cutter comprising a housing; a hollow shaft mounted rotatably in said housing and provided with a forward projecting end having radial slots; cutting bits projecting through said slots; a mandrel member slidable in said shaft and having diverging faces engaging the bits; means including a rotary jack shaft parallel to the hollow shaft for rotating the mandrel and hollow shaft; means for at will automatically advancing the mandrel and projecting the cutting bits as the hollow shaft rotates; said jack shaft being projected from the forward end of the housing; lateral brackets on the forward part of the housing; a squaring member spaced around the shaft right angularly transverse thereto forward of the housing; screws mounted in said brackets having their forward ends rotatably mounted in said member; internally threaded pinions on said screws; a ring gear around and meshing with the pinions; and a gear train connected to the projecting end of the jack shaft and having a gear meshing with ring gear for driving the ring gear and pinions and thereby driving the housing and bits longitudinally relative to the squaring member.

16. In combination, a support; a shaft rotatably mounted in said support and having a projecting forward end having radial slots; bore engaging tools projecting through said slots; a brake drum coaxially with the shaft and mounted for rotation relative thereto; means for rotating the shaft; means operatively connected to the shaft and drum for retracting or projecting the tools on rotation of the shaft and drum relative to each other; and adjustable brake means for varying pressure on the drum.

17. In combination a support; a hollow shaft rotatably mounted in said support and provided with a projecting forward end having radial slots; bore engaging tools in the slots; a mandrel slidable in said shaft and having a threaded bore in its rear end; means operated by the mandrel for projecting the tools as the mandrel advances; a screw rod engaged in said threaded bore and provided with a brake drum; an adjustable brake means for varying pressure on the drum; whereby to effect relative rotation between the shaft and drum to cause the mandrel to advance and project the tools; and means for rotating the mandrel and hollow shaft.

18. In combination, a support; a shaft rotatably mounted in said support and having a forward projecting end; cutting bits projecting from said end; drive means for rotating the shaft; a transverse engagement member disposed in a plane transverse to said projecting end, and means for longitudinally moving the shaft and support with respect to the engagement member by rotation of said shaft and bits.

19. In a combination as in claim 18, means to project the bits as the shaft rotates.

20. In a combination as in claim 18, means to at will automatically gradually project the bits as the shaft rotates.

HOWARD W. JOHNSON.